(12) United States Patent
Ando et al.

(10) Patent No.: US 12,355,033 B2
(45) Date of Patent: Jul. 8, 2025

(54) ALL-SOLID-STATE BATTERY

(71) Applicant: TOYOTA JIDOSHA KABUSHIKI KAISHA, Toyota (JP)

(72) Inventors: Sho Ando, Seto (JP); Akira Kiyama, Toyota (JP); Masaki Kato, Zushi (JP); Koshiro Yoneda, Ichinomiya (JP); Kensaku Miyazawa, Toyota (JP); Kunimitsu Yamamoto, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 347 days.

(21) Appl. No.: 17/376,956

(22) Filed: Jul. 15, 2021

(65) Prior Publication Data

US 2022/0059876 A1   Feb. 24, 2022

(30) Foreign Application Priority Data

Aug. 21, 2020 (JP) ................................ 2020-140080

(51) Int. Cl.
*H01M 10/0585* (2010.01)
*H01M 10/0525* (2010.01)

(52) U.S. Cl.
CPC ... *H01M 10/0585* (2013.01); *H01M 10/0525* (2013.01)

(58) Field of Classification Search
CPC ......... H01M 50/1245; H01M 10/0562; H01M 50/133; H01M 50/578; H01M 10/0585; H01M 50/105; H01M 50/126; H01M 50/119; H01M 50/131
See application file for complete search history.

(56) References Cited

U.S. PATENT DOCUMENTS

| | | | | |
|---|---|---|---|---|
| 6,387,562 B1* | 5/2002 | Akahira | ............... | H01M 50/105 429/211 |
| 2001/0051298 A1* | 12/2001 | Hanafusa | ............ | H01M 50/105 429/162 |
| 2012/0183706 A1* | 7/2012 | Kang | ..................... | B32B 27/30 428/29 |
| 2014/0272488 A1* | 9/2014 | Kim | .................... | H01M 10/058 429/56 |

(Continued)

FOREIGN PATENT DOCUMENTS

| | | |
|---|---|---|
| JP | 7-211300 A | 8/1995 |
| JP | 11-312505 A | 11/1999 |

(Continued)

OTHER PUBLICATIONS

Shim, K. H., et al. "Investigation on blanking of thin sheet metal using the ductile fracture criterion and its experimental verification." Journal of Materials Processing Technology 155 (2004): 1935-1942. https://doi.org/10.1016/j.jmatprotec.2004.04.284 (Year: 2004).*

*Primary Examiner* — Allison Bourke
*Assistant Examiner* — Kayla Elaine Clary
(74) *Attorney, Agent, or Firm* — Sughrue Mion, PLLC

(57) ABSTRACT

An all-solid-state battery includes a solid electrode body including a positive electrode layer, a solid electrolyte layer, and a negative electrode layer, and a laminate film that stores the solid electrode body. The laminate film has a fragile part with respect to a needle-like foreign substance. The strength of the fragile part is lower than the strength of a part of the laminate film other than the fragile part.

3 Claims, 4 Drawing Sheets

(56) References Cited

U.S. PATENT DOCUMENTS

| | | | |
|---|---|---|---|
| 2016/0260552 A1* | 9/2016 | Sato | H01M 50/178 |
| 2018/0233711 A1 | 8/2018 | Kato | |
| 2020/0144561 A1* | 5/2020 | Shin | B32B 15/088 |
| 2020/0377690 A1* | 12/2020 | Ootsuki | H01M 50/105 |
| 2022/0328862 A1* | 10/2022 | Otsuka | H01M 50/131 |

FOREIGN PATENT DOCUMENTS

| | | |
|---|---|---|
| JP | 2009-16275 A | 1/2009 |
| JP | 2014-22224 A | 2/2014 |
| JP | 2016-039094 A | 3/2016 |
| JP | 2018-133175 A | 8/2018 |

* cited by examiner

ALL-SOLID-STATE BATTERY

CROSS-REFERENCE TO RELATED APPLICATION

This application claims priority to Japanese Patent Application No. 2020-140080 filed on Aug. 21, 2020, incorporated herein by reference in its entirety.

BACKGROUND

1. Technical Field

The present disclosure relates to an all-solid-state battery.

2. Description of Related Art

In the related art, a "laminated battery" including a laminate film as a housing (exterior body) is used. The laminate film includes a metal foil and a resin film that covers the metal foil. In addition, in contrast to liquid batteries in which battery elements (an electrode active material and an electrolyte) of a liquid battery contain a liquid, the development of "all-solid-state batteries" in which battery elements are only solids has been conducted in recent years. For example, Japanese Unexamined Patent Application Publication No. 2018-133175 (JP 2018-133175 A) discloses a laminated all-solid-state battery.

SUMMARY

A situation in which an external stimulus is applied to (for example, a foreign substance is pressed against) a laminated all-solid-state battery may occur. When the foreign substance has a needle-like tip shape, the foreign substance can penetrate through the laminate film. In this case, until the foreign substance penetrates through the laminate film, a pressure is applied to a solid electrode body (solid battery element) accommodated in the laminate film through the laminate film. An area of a part of the solid electrode body to which a pressure (surface pressure) is applied through the laminate film is larger than an area of a needle-like foreign substance. Therefore, the solid electrode body may be cracked or crushed (hereinafter, collectively referred to as "cracking").

The present disclosure is provided to inhibit cracking of a solid electrode body when a foreign substance is pressed against an all-solid-state battery.

(1) An all-solid-state battery according to an aspect of the present disclosure includes a solid electrode body including a positive electrode layer, a solid electrolyte layer, and a negative electrode layer, and a laminate film that accommodates the solid electrode body. The laminate film has a fragile part with respect to a needle-like external stimulus. A strength of the fragile part is lower than a strength of a part of the laminate film other than the fragile part.

(2) The laminate film may include a metal foil and a resin layer that covers the metal foil. The fragile part may be a metal foil. The fragile part may be a part of the metal foil in which at least one through-hole is provided.

(3) The at least one through-hole may be a plurality of through-holes. The metal foil may be any of a punching metal, an expand metal, and a lath metal.

(4) The resin film may have a thick-wall part and a thin-wall part which have different thicknesses from each other. The fragile part may include a part in which the at least one through-hole is provided and a thin-wall part.

(5) The laminate film may include a metal layer and a resin layer that covers the metal layer. The resin layer may have a thick-wall part and a thin-wall part which have different thicknesses from each other. The fragile part may be a thin-wall part.

In the above configurations (1) to (5), a fragile part that is fragile to the needle-like external stimulus (foreign substance) is provided in the laminate film. By making it easier for the foreign substance to penetrate through the laminate film in the fragile part, it is possible to prevent the pressure from continuously increasing until the foreign substance penetrates, and it is possible to reduce the maximum value of the pressure applied to the electrode body (details will be described below). Therefore, according to the above configurations (1) to (5), it is possible to inhibit cracking of the solid electrode body.

According to the present disclosure, it is possible to inhibit cracking of a solid electrode body when a foreign substance is pressed against an all-solid-state battery.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
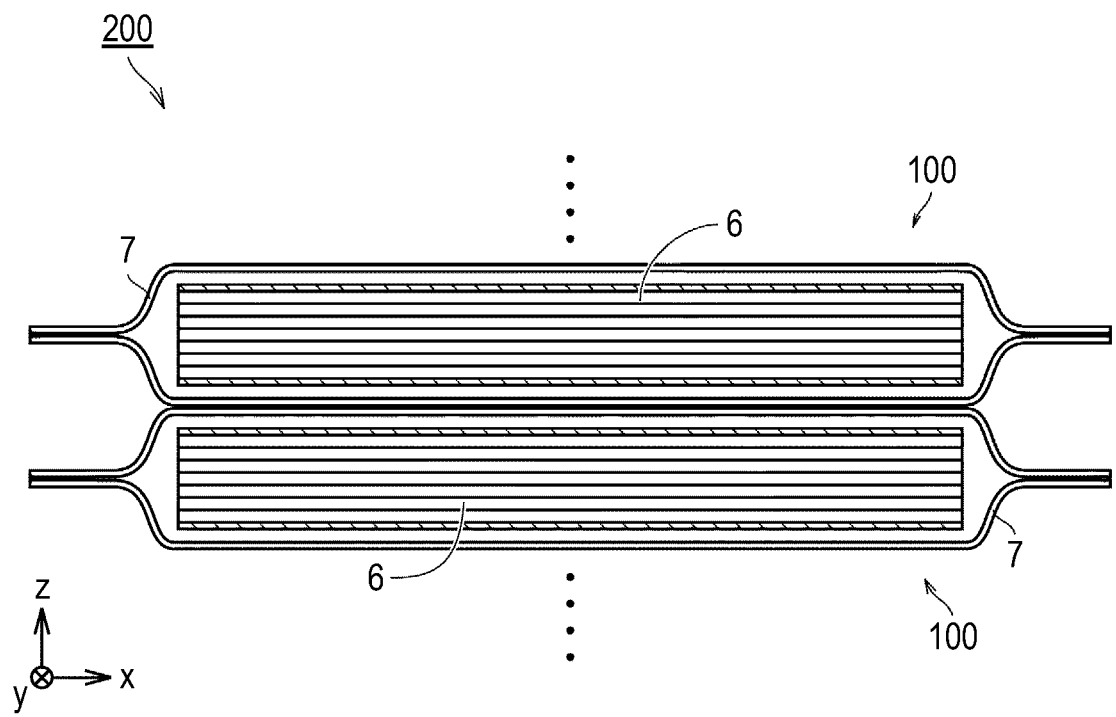
FIG. 1 is a cross-sectional view schematically showing an example of an overall configuration of an all-solid-state battery according to the first embodiment.

Hereinafter, embodiments of the present disclosure will be described in detail with reference to the drawings. Here, the same or corresponding parts in the drawings will be denoted with the same reference numerals and descriptions thereof will not be repeated.

First Embodiment

<Overall configuration of all-solid-state battery>

FIG. 1 is a cross-sectional view schematically showing an example of an overall configuration of an all-solid-state battery according to the first embodiment. With reference to FIG. 1, each of a plurality of all-solid-state batteries (hereinafter abbreviated to "battery") 1 has a flat shape. In the example shown in FIG. 1, a plurality of batteries 100 are laminated in a thickness direction (z direction) and electrically connected to form an assembled battery 200.

Although not shown, the assembled battery 200 may further include any other member in addition to the plurality of batteries 100. The assembled battery 200 may further include, for example, a restraint member (not shown). The restraint member may include, for example, a pair of end plates and a connecting band. In addition, the assembled battery 200 may further include, for example, a cooling plate (not shown) in which a refrigerant flow path is provided.

However, it is not necessary to form the assembled battery 200 with the plurality of batteries 100, and the battery 100 may be used as a single battery. Hereinafter, the battery 100 in a single battery form will be described.

Figure 2:
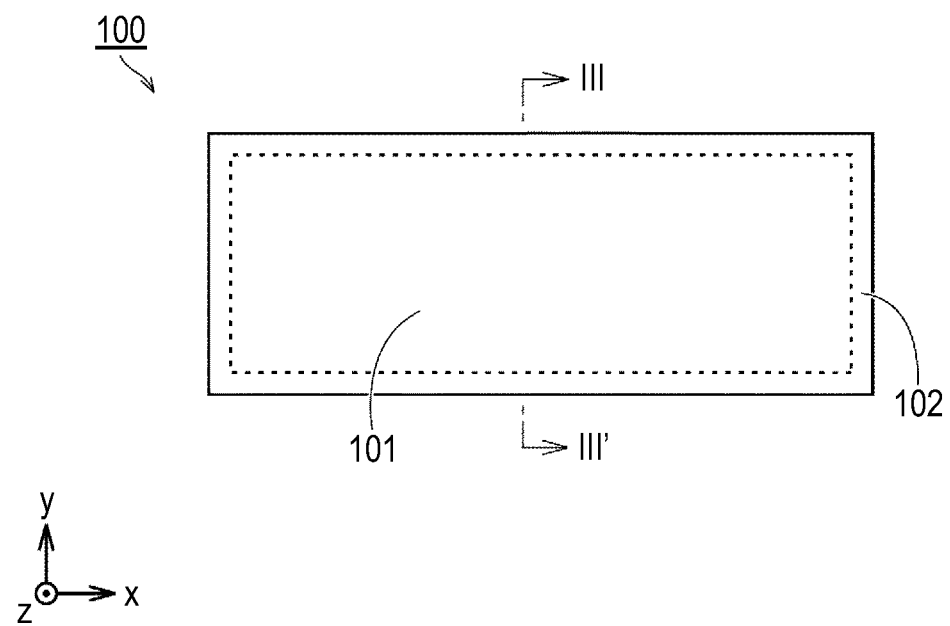
FIG. 2 is a plan view of a battery.
Figure 3:
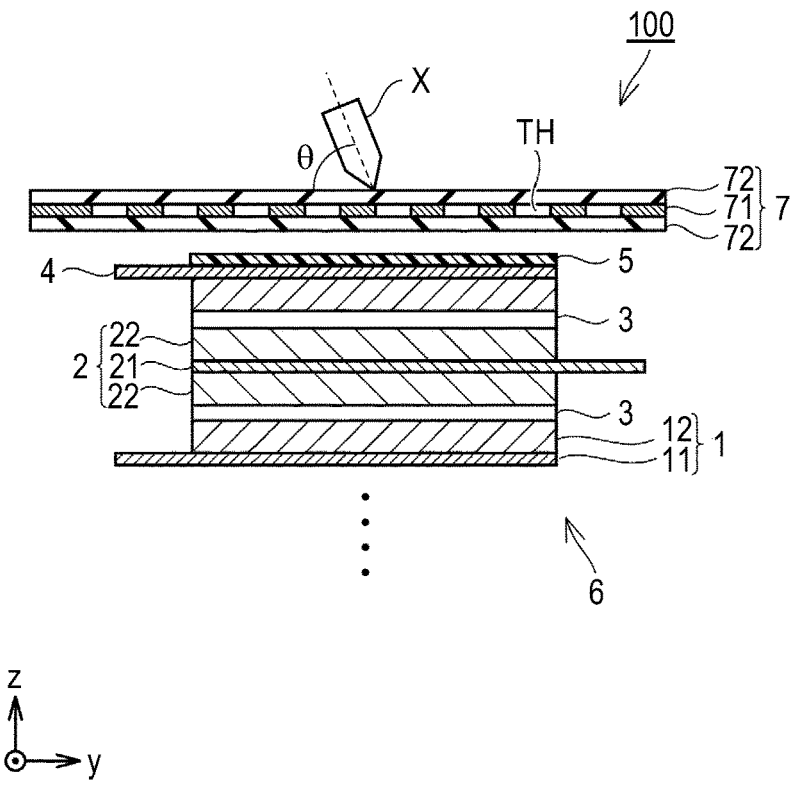
FIG. 3 is a cross-sectional view of a battery along the line in FIG. 2.

FIG. 2 is a plan view of the battery 100. FIG. 3 is a cross-sectional view of the battery 100 along the line in FIG. 2. Referring to FIG. 1 to FIG. 3, the battery 100 includes a solid electrode body 6 and a laminate film 7. The battery 100 in a plan view (a plan view in FIG. 2) includes a central part 101 and an outer peripheral part 102 that surrounds the central part 101. FIG. 3 shows a cross section of the battery 100 in the central part 101.

<Detailed configuration of components>

The solid electrode body 6 includes a positive electrode layer 1, a negative electrode layer 2, a solid electrolyte layer 3, a current collector 4, and an insulation film 5. The solid electrode body 6 is a laminated electrode body, and is formed by laminating the positive electrode layer 1, the solid electrolyte layer 3 and the negative electrode layer 2. The solid electrode body 6 may have any laminate structure as long as it includes one or more of each of the positive electrode layer 1, the solid electrolyte layer 3 and the negative electrode layer 2. For example, the solid electrode body 6 may be formed by laminating the positive electrode layer 1, the solid electrolyte layer 3 and the negative electrode layer 2 in that order.

The positive electrode layer 1 is brought into close contact with the solid electrolyte layer 3. The positive electrode layer 1 may include at least a positive electrode active material layer 12. The positive electrode layer 1 may be substantially composed of the positive electrode active material layer 12. The positive electrode layer 1 may include a positive electrode current collector 11 and the positive electrode active material layer 12.

The positive electrode current collector 11 may have, for example, a thickness of 5 μm to 50 μm. The positive electrode current collector 11 may include, for example, an aluminum (Al) foil.

The positive electrode active material layer 12 may have, for example, a thickness of 10 μm to 200 μm. The positive electrode active material layer 12 may contain a positive electrode active material. The positive electrode active material layer 12 may be substantially made of a positive electrode active material. The positive electrode active material layer 12 may contain a solid electrolyte, a conductive material, a binder, and the like in addition to the positive electrode active material.

The positive electrode active material may contain, for example, at least one selected from the group consisting of lithium cobalt oxide, lithium nickelate, lithium manganate, nickel cobalt lithium manganate ($LiNi_{1/3}Co_{1/3}Mn_{1/3}O_2$, or the like), nickel cobalt lithium aluminate, and lithium iron phosphate. The solid electrolyte may contain, for example, a sulfide solid electrolyte ($LiBr$—$LiI$—($Li_2S$—$P_2S_5$), or the like). The conductive material may contain, for example, a conductive carbon material (vapor-grown carbon fibers (VGCF), or the like). The binder may contain, for example, polyvinylidene fluoride (PVdF).

The negative electrode layer 2 is brought into close contact with the solid electrolyte layer 3. The negative electrode layer 2 includes at least a negative electrode active material layer 22. The negative electrode layer 2 may be substantially composed of the negative electrode active material layer 22. The negative electrode layer 2 may include a negative electrode current collector 21 and the negative electrode active material layer 22. The negative electrode current collector 21 may have, for example, a thickness of 5 μm to 50 μm. The negative electrode current collector 21 may include, for example, a copper (Cu) foil and a nickel (Ni) foil.

The negative electrode active material layer 22 may have, for example, a thickness of 10 μm to 200 μm. The negative electrode active material layer 22 contains a negative electrode active material. For example, the negative electrode active material layer 22 may be substantially made of a negative electrode active material. The negative electrode active material layer 22 may contain a solid electrolyte, a conductive material, a binder, and the like in addition to the negative electrode active material.

The negative electrode active material may contain, for example, at least one selected from the group consisting of graphite, soft carbon, hard carbon, silicon, silicon oxide, silicon-based alloys, tin, tin oxide, tin-based alloys, and lithium titanate. The solid electrolyte may contain, for example, a sulfide solid electrolyte ($LiBr$—$LiI$—($Li_2S$—$P_2S_5$), or the like). The conductive material may contain, for example, a conductive carbon material (VGCF, or the like). The binder may contain, for example, PVdF.

The solid electrolyte layer 3 is disposed between the positive electrode layer 1 and the negative electrode layer 2. The solid electrolyte layer 3 spatially separates the positive electrode layer 1 and the negative electrode layer 2. The solid electrolyte layer 3 blocks electron conduction between the positive electrode layer 1 and the negative electrode layer 2 and forms an ion conduction path between the positive electrode layer 1 and the negative electrode layer 2. The solid electrolyte layer 3 may have, for example, a thickness of 1 μm to 100 μm.

The solid electrolyte layer 3 contains a solid electrolyte. The solid electrolyte layer 3 may consist substantially of a solid electrolyte. The solid electrolyte layer 3 may contain a binder and the like in addition to the solid electrolyte. The solid electrolyte may contain, for example, a sulfide solid electrolyte. The sulfide solid electrolyte may contain lithium phosphorus sulfide and the like. The solid electrolyte may contain, for example, an oxide solid electrolyte. The binder may contain, for example, butadiene rubber.

The current collector 4 is disposed outside the positive electrode layer 1, the negative electrode layer 2 and the solid electrolyte layer 3 (the outermost layer of the solid electrode body 6). The current collector 4 may be adhered to the outermost layer of the solid electrode body 6 using an adhesive such as a hot melt. The current collector 4 electrically connects the solid electrode body 6 and an external terminal (not shown). The current collector 4 may include, for example, an Al foil, a Ni foil, or a Cu foil. The current collector 4 itself may also serve as an external terminal. When the outermost layer of the solid electrode body 6 is the positive electrode layer 1, the current collector 4 has positive electrode properties. When the outermost layer of the solid electrode body 6 is the negative electrode layer 2, the current collector 4 has negative electrode properties.

The insulation film 5 is disposed on the surface of the current collector 4. The insulation film 5 may cover the entire surface of the current collector 4 or may cover only a part of the surface of the current collector 4. The insulation film 5 insulates between the laminate film 7 (a metal foil 71 to be described below) and the current collector 4. The insulation film 5 may be substantially made of an insulating material. The insulation film 5 may contain, for example, a binder, in addition to the insulating material. The insulation film 5 may have, for example, a thickness of 0.1 µm to 100 µm.

The laminate film 7 is an exterior body which accommodates the solid electrode body 6 and also seals the solid electrode body 6. The laminate film 7 includes the metal foil 71 and a resin film 72. The metal foil 71 prevents a gas generated inside the battery 100 from leaking to the outside. The resin film 72 covers both surfaces of the metal foil 71, and thus improves the strength of the laminate film 7.

The laminate film 7 is, for example, a pouch made of an aluminum laminate film. In this case, the metal foil 71 is an Al foil. The resin film 72 is, for example, a polyethylene terephthalate (PET) film. The pouch made of an aluminum laminate film may be sealed by heat welding.

<Pressing with Foreign Substance>

A situation in which an external stimulus is applied to the battery 100 configured as described above, more specifically, a situation in which a foreign substance X (for example, a metal foreign substance) is pressed from the outside, may occur. FIG. 3 shows a situation in which the foreign substance X is pressed against the surface of the laminate film 7 in a direction of an angle θ. When the foreign substance X has a sharp tip shape (needle shape), the foreign substance X may penetrate through the laminate film 7. In this case, a pressure is applied to the solid electrode body 6 accommodated inside the laminate film 7 through the laminate film 7 from when the tip of the foreign substance X comes into contact with the laminate film 7 until it penetrates through the laminate film 7. An area of a part of the solid electrode body 6 to which a pressure is applied through the laminate film 7 is larger than an area of the tip of the foreign substance X. As a result, when a pressure (surface pressure) is applied over a wide range, the solid electrode body 6 may be cracked or crushed.

Therefore, in the first embodiment, a part (fragile part) that is intentionally designed to be fragile so that the foreign substance X can easily penetrate therethrough is provided in the laminate film 7. More specifically, at least one through-hole TH is provided in the metal foil 71 constituting the laminate film 7.

Figure 4:
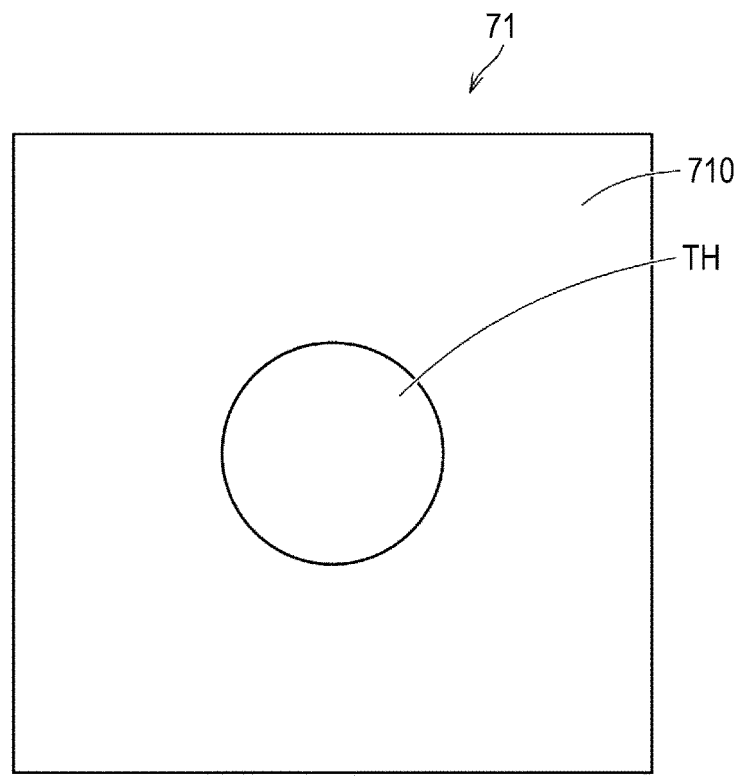
FIG. 4 is a top view showing an example of a structure of a metal foil in the first embodiment.

FIG. 4 is a top view showing an example of a structure of the metal foil 71 in the first embodiment. Referring to FIG. 4, in the metal foil 71, for example, one through-hole TH is provided at any one part of a substrate 710 (an Al foil or the like). There is only the resin film 72 in the part in which the through-hole TH is provided. For example, the part in which the through-hole TH is provided is determined by obtaining a part in which the foreign substance X easily enters by a design or experiment. The hole diameter of the through-hole TH can be appropriately set within a range of, for example, several mm to several cm, according to the assumed size of the foreign substance X and the like.

Figure 5:
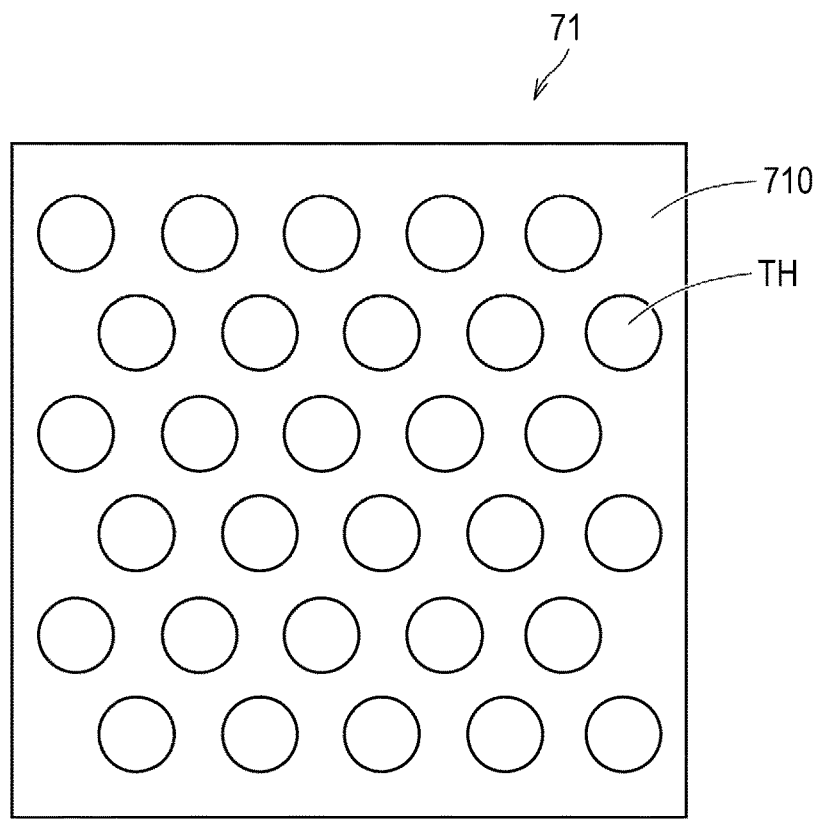
FIG. 5 is a top view showing another example of the structure of the metal foil in the first embodiment.

FIG. 5 is a top view showing another example of the structure of the metal foil 71 in the first embodiment. Referring to FIG. 5 the metal foil 71 may be, for example, a punching metal obtained by punching the substrate 710 (an Al foil or the like) of the metal foil 71. The hole diameter of the through-hole TH is set appropriately, and can be set to, for example, sub mm (several hundreds of µm) to several mm. An area ratio of a total area of the through-hole TH to a total area of the substrate 710 can be appropriately set according to the thickness of the substrate 710 and the like.

Here, the metal foil 71 in the example shown in FIG. 5 is not limited to the punching metal as long as it is a flat metal foil in which a plurality of through-holes TH are provided. The metal foil 71 may be an expand metal, a lath metal, or the like.

Figure 6:
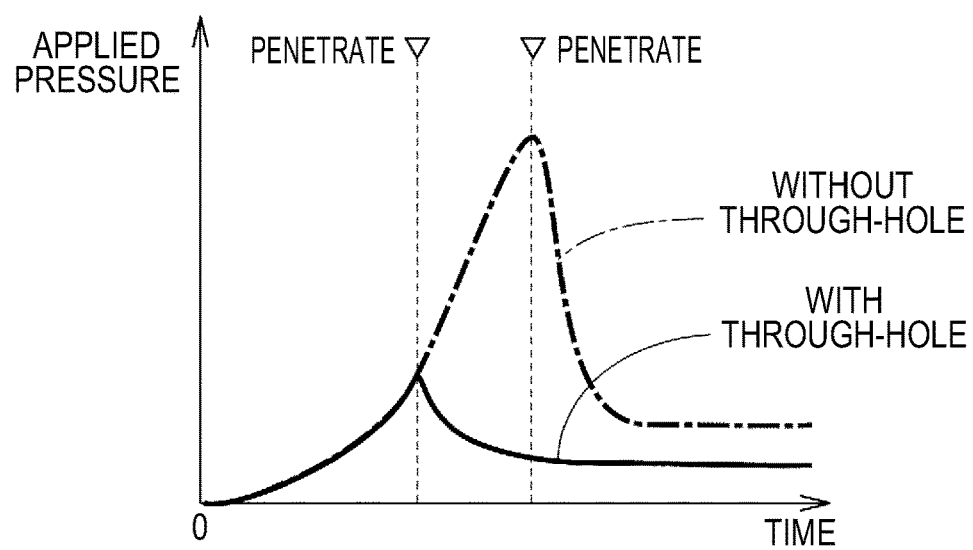
FIG. 6 is a diagram schematically showing change over time of a pressure applied to a solid electrode body by being pressed with a foreign substance.

FIG. 6 is a diagram schematically showing the change over time of the pressure applied to the solid electrode body 6 by being pressed with the foreign substance X. In FIG. 6, the horizontal axis represents the elapsed time. The vertical axis represents the pressure (surface pressure) applied to the solid electrode body 6.

Referring to FIG. 6, when no through-hole is provided in the metal foil, a pressure applied to the solid electrode body 6 through the laminate film 7 continues to increase until the foreign substance X penetrates through the laminate film 7 (refer to the one-dot chain line). Therefore, when the foreign substance X penetrates through the laminate film 7, the pressure can reach a large value. Therefore, the solid electrode body 6 is likely to be cracked.

On the other hand, in the present embodiment, when one or a plurality of through-holes TH are provided in the metal foil 71, the strength of the laminate film 7 with respect to the foreign substance X having a sharp tip shape is partially reduced compared to a configuration in which no through-hole is provided in the metal foil. In other words, since only the resin film 72 is present in a part in which one or a plurality of through-holes TH are provided, the laminate film 7 is locally easily penetrated by the foreign substance X. Then, the foreign substance X penetrates through the laminate film 7 before a pressure applied to the solid electrode body 6 through the laminate film 7 increases to a large value (refer to a solid line). As a result, the solid electrode body 6 is unlikely to be cracked.

As described above, in the first embodiment, at least one through-hole TH is provided in the metal foil 71. When a part in which there is only the resin film 72 is provided, the strength of the metal foil 71 with respect to the foreign substance X is intentionally reduced. Therefore, by making it easier for the foreign substance X to penetrate through the laminate film 7, it prevents the pressure from continuously increasing until the foreign substance X penetrates. Then, as described with reference to FIG. 6, the maximum value of the pressure applied to the solid electrode body 6 through the laminate film 7 is reduced. Therefore, according to the first embodiment, it is possible to inhibit cracking of the solid electrode body 6.

Second Embodiment

In the first embodiment, an example in which at least one through-hole TH is provided in the metal foil 71 has been described. However, other configurations can be used as long as a laminate film becomes fragile enough for the foreign substance X to easily penetrate it. In the second embodiment, a configuration in which a resin film covering a metal foil becomes fragile according to penetration of the foreign substance X will be described.

Figure 7:
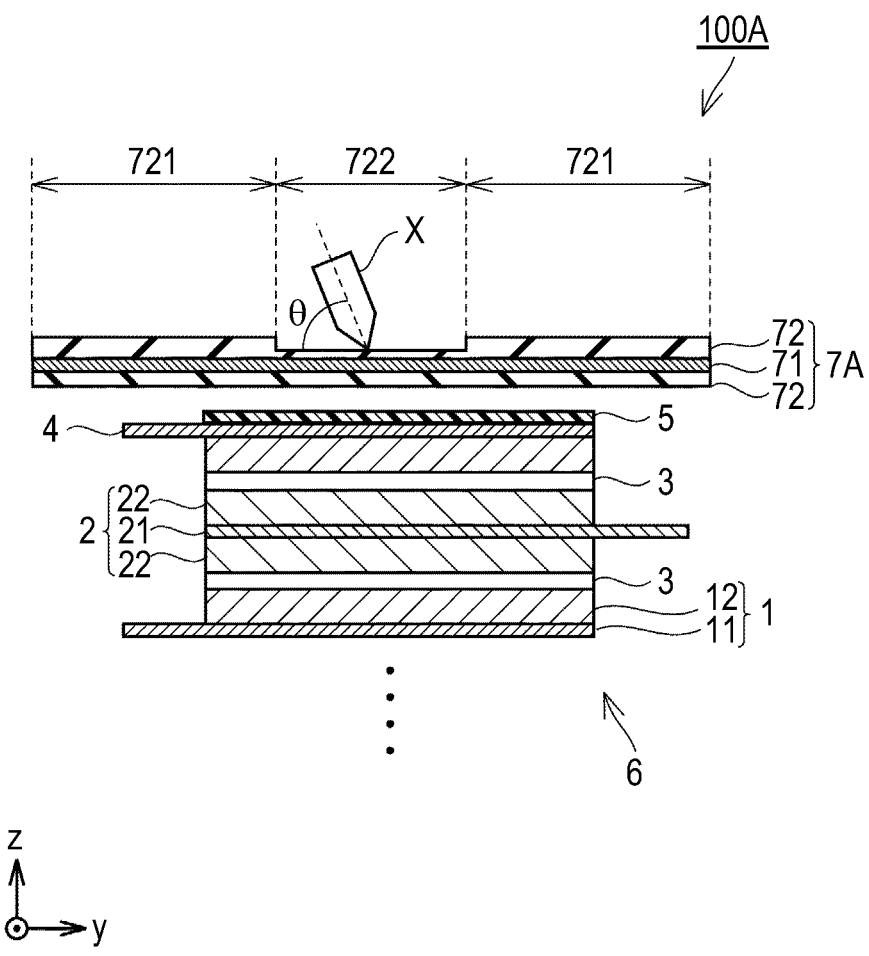
FIG. 7 is a cross-sectional view of a battery in the second embodiment.

FIG. 7 is a cross-sectional view of a battery in the second embodiment. FIG. 7 is compared with FIG. 3. Referring to FIG. 7, a battery 100A is different from the battery 100 in the first embodiment in that a laminate film 7A is provided in place of the laminate film 7. The configuration of the solid electrode body 6 is common.

In the laminate film 7A, the resin film 72 has a thick-wall part 721 and a thin-wall part 722. The thickness of the thin-wall part 722 is thinner than the thickness of the thick-wall part 721. It is preferable to provide the thin-wall part 722 in a part of the surface of the resin film 72 that easily comes in contact with the foreign substance X. The part that easily comes in contact with the foreign substance X can be experimentally determined, for example, by collecting a plurality of batteries and analyzing parts damaged by the foreign substance.

In a part of the resin film 72 in which the thin-wall part 722 is provided, the strength of the laminate film 7A is lower than that of the part in which the thick-wall part 721 is provided. That is, the laminate film 7A is easily penetrated by the foreign substance X in the thin-wall part 722. Then, as described in the first embodiment with reference to FIG. 6, before the pressure applied to the solid electrode body 6 through the laminate film 7A reaches a large value, the foreign substance X penetrates through the laminate film 7A. As a result, the solid electrode body 6 is unlikely to be cracked.

Here, although the thin-wall part 722 is provided at only one part in the example shown in FIG. 7, the thin-wall part 722 may be provided at a plurality of parts. In addition, in the example shown in FIG. 7, within the resin film 72 that covers the inner surface (the lower surface in the drawing) and the outer surface (the upper surface) of the metal foil 71, the thickness of the resin film 72 covering the outer surface of the metal foil 71 is partially thinned to realize the thin-wall part 722. However, the thickness of the resin film 72 covering the inner surface of the metal foil 71 may be partially thinned to realize the thin-wall part 722. In addition, both the thickness of the resin film 72 covering the outer surface of the metal foil 71 and the thickness of the resin film 72 covering the inner surface of the metal foil 71 may be thinned.

As described above, in the second embodiment, the thin-wall part 722 is provided in the resin film 72. When the thin-wall part 722 is provided to intentionally lower the strength of the resin film 72 and makes it easier for the foreign substance X to penetrate through the laminate film 7A, it prevents the pressure from continuously increasing until the foreign substance X penetrates. Therefore, the maximum value of the pressure applied to the solid electrode body 6 through the laminate film 7A is reduced. Therefore, according to the second embodiment, as in the first embodiment, it is possible to inhibit cracking of the solid electrode body 6.

Here, the first embodiment and the second embodiment may be combined. That is, the metal foil 71 in which at least one through-hole TH is provided and the resin film 72 having the thick-wall part 721 and the thin-wall part 722 can be combined.

[Evaluation Test]

Finally, results of an evaluation test conducted by the inventors will be described. In the evaluation test, a nail with a diameter of 3 mm was used as the foreign substance X. The angle θ (refer to FIG. 3) at which the foreign substance X was pressed against the surface of the laminate film 7 was 45°. The moving speed of the foreign substance X was set to 2 min/s. A state of charge (SOC) when the test of the battery 100 according to the first embodiment and the battery 100A according to the second embodiment started was set to 100%. When the voltage of each battery dropped by 2 mV, movement of the foreign substance X was stopped. The temperature was measured at a position 1 cm from the position pressed with the foreign substance X. The evaluation test was performed under an environment at room temperature.

Based on the results of the evaluation test, it was confirmed that, in both the battery 100 according to the first embodiment and the battery 100A according to the second embodiment, the number of short-circuited layers of the solid electrode body 6 was reduced two compared to a comparative example in which these measures were not implemented.

The embodiments disclosed here are only examples in all respects and should not be considered as restrictive. The scope of the present disclosure is shown in the scope of the claims rather than the descriptions of the above embodiments, and is intended to include the scope in the claims, equivalents to the scope of the claims, and all modifications in the scope of the claims.

What is claimed is:

1. An all-solid-state battery, comprising:
   a solid electrode body including a positive electrode layer, a solid electrolyte layer, and a negative electrode layer; and
   a laminate film that accommodates the solid electrode body,
   the laminate film has a fragile part,
   wherein a strength of the fragile part is lower than a strength of a part of the laminate film other than the fragile part,
   wherein the laminate film includes a metal foil and a resin film,
   wherein the resin film includes a first resin film which directly contacts an exterior surface of the metal foil and a second resin film which directly contacts an interior surface of the metal foil, and the metal foil has at least one through-hole,
   wherein only the resin film is present in a part in which the at least one through-hole is provided,
   wherein the first resin film has a thin portion and a thick portion which have different thicknesses from each other, and the resin film has a thick-wall part and a thin-wall part corresponding to the thin portion and the thick portion of the first resin film,
   wherein the fragile part includes the part in which the at least one through-hole is provided combined with the thin-wall part along the laminate film.

2. The all-solid-state battery according to claim 1, wherein the at least one through-hole is a plurality of through-holes, and
   wherein the metal foil is any of a punching metal, an expand metal, and a lath metal.

3. The all-solid-state battery according to claim 1, wherein the laminate film seals and accommodates the solid electrode body.

* * * * *